(12) United States Patent
Wang et al.

(10) Patent No.: US 6,689,469 B2
(45) Date of Patent: Feb. 10, 2004

(54) CRYSTALLINE POLYMER NANO-PARTICLES

(75) Inventors: Xiaorong Wang, Hudson, OH (US); Victor J. Foltz, Akron, OH (US); Pat Sadhukhan, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/038,748

(22) Filed: Dec. 31, 2001

(65) Prior Publication Data

US 2003/0124353 A1 Jul. 3, 2003

(51) Int. Cl.[7] .................................................. B32B 5/66
(52) U.S. Cl. ........................ 428/403; 428/407; 525/313; 525/314; 525/332.2; 525/332.9
(58) Field of Search ................................. 525/313, 314, 525/332.2, 332.9; 428/403, 407

(56) References Cited

U.S. PATENT DOCUMENTS

| | | |
|---|---|---|
| 4,773,521 A | 9/1988 | Chen |
| 4,829,135 A | 5/1989 | Gunesin et al. |
| 4,942,209 A | 7/1990 | Gunesin |
| 5,594,072 A | 1/1997 | Handlin, Jr. et al. |
| 5,763,551 A | 6/1998 | Wünsch et al. |
| 5,847,054 A | 12/1998 | McKee et al. |
| 5,883,173 A | 3/1999 | Elspass et al. |
| 5,891,947 A | 4/1999 | Hall et al. |
| 6,087,016 A | 7/2000 | Feeney et al. |
| 6,147,151 A | 11/2000 | Fukumoto et al. |
| 6,255,372 B1 | 7/2001 | Lin et al. |
| 6,437,050 B1 * | 8/2002 | Krom .......................... 525/313 |

OTHER PUBLICATIONS

Star Polymers by Immobilizing Functional Block Copolymers, by Koji Ishizu, Tokyo Institute of Technology, Meguro–ku, Tokyo, Japan, *Star and Hyperbranched Polymers*, 1999, ISBN 0–8247–1986–7.

* cited by examiner

Primary Examiner—Leszek Kiliman
(74) Attorney, Agent, or Firm—Scott McCollister; Meredith Palmer

(57) ABSTRACT

A polymer nano-particle composition is provided. The composition includes polymer nano-particles having a poly (alkenylbenzene) core and a surface layer comprising a crystalline polyolefin. The nano-particles preferably have a mean average diameter of less than about 100 nm.

20 Claims, 2 Drawing Sheets

CRYSTALLINE POLYMER NANO-PARTICLES

BACKGROUND OF THE INVENTION

The present invention relates to polymer nano-particles, a method for their preparation, and their use.

Polymer nano-particles have attracted increased attention over the past several years in a variety of fields including catalysis, combinatorial chemistry, protein supports, magnets, and photonic crystals. Similarly, vinyl aromatic (e.g. polystyrene) nano-particles have been prepared for uses as a reference standard in the calibration of various instruments, particularly in medical research and diagnostic tests. Such polystyrene nano-particles have been prepared by emulsion polymerization.

Nano-particles can be discrete particles uniformly dispersed throughout a host composition. Nano-particles preferably are monodisperse in size and uniform in shape. However, controlling the size of nano-particles during polymerization and/or the surface characteristics of such nano-particles can be difficult. Moreover, achieving better control over the surface composition of such polymer nano-particles also is desirable.

Rubbers may be modified by the addition of various polymer compositions. Such polymeric additives often improve the physical properties of rubber compositions. Specifically, moldability and tenacity are often improved through such modifications.

Recently, there has been considerable interest in forming nanocomposites as a means to improve the mechanical properties of polymers. Incorporating clay minerals in a polymer matrix, however, does not always result in markedly improved mechanical properties of the polymer. This may be due to the lack of affinity between the layered silicate materials and the organic polymers. Thus it has been proposed to use ionic interactions as a means of incorporating clay minerals in a polymer. This type of approach, unfortunately, has limited usefulness. Indeed, a more direct, simple, and economic approach to preparing nanocomposites is highly desirable.

Development of nano-particles having a crystalline surface layer which would be applicable to a wide variety of rubbers and elastomers is desirable because discrete particles could be thermally stable and could disperse evenly throughout the matrix to provide a uniform composition. Also, the potential benefits of nano-particles are pervasive in technologies including information technology, medicine and health, material and manufacturing, aeronautics and space exploration, environmental and energy applications. However, past attempts to form such nano-particles have been largely unsuccessful.

SUMMARY OF THE INVENTION

In one embodiment of the present invention, a polymer nano-particle composition is provided. The composition includes polymer nano-particles having a poly(alkenylbenzene) core and a surface layer comprising a crystalline polyolefin. The nano-particles preferably have a mean average diameter of less than about 100 nm.

In another embodiment, a process for forming polymer nano-particles is provided. The process includes polymerizing alkenylbenzene monomer and diene monomer in a hydrocarbon solvent to form a diblock polymer. After the polymerization has begun, a polymerization mixture including micelles of the diblock polymer is formed, followed by addition of at least one crosslinking, agent to the polymerization mixture. This addition aids in the formation of crosslinked nano-particles having a poly(alkenylbenzene) core and a poly(conjugated diene) surface layer from said micelles. In a final step, the poly(conjugated diene) surface layer is hydrogenated to provide a polycrystalline surface layer.

In a third embodiment, a polymer nano-particle is provided. The nano-particle includes a polycrystalline outer surface and a vinyl-substituted aromatic hydrocarbon contributed unit core including a crosslinking agent. The nano-particles are preferably less than 100 nm in diameter and have a $M_w$ between about 100,000 and 3,000,000.

In another embodiment, a rubber composition including a blend of rubber and a plurality of polycrystalline nano-particles is provided.

Herein throughout, unless specifically stated otherwise:
"vinyl-substituted aromatic hydrocarbon" and "alkenylbenzene" are used interchangeably; and
"rubber" refers to rubber compounds, including natural rubber, and synthetic elastomers including styrene-butadiene rubber, ethylene propylene rubber, etc., which are known in the art.

DETAILED DESCRIPTION OF ILLUSTRATIVE EMBODIMENTS

Figure 1:
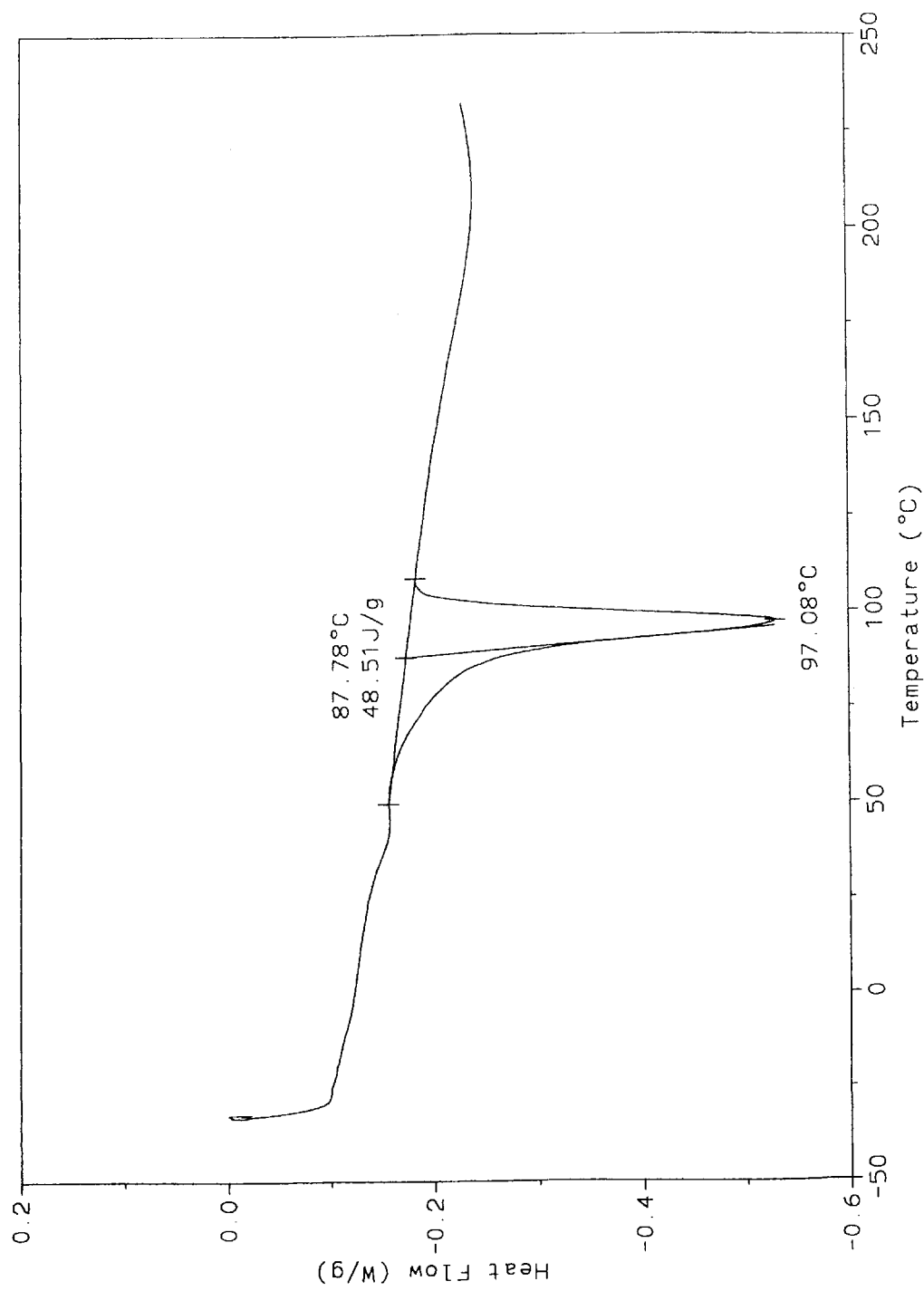
FIG. 1 is a graphical depiction of DSC analysis of the inventive polycrystalline nano-particles.

The polymer nano-particle is formed from diblock polymer chains having a poly(diene) block and a poly(alkenylbenzene) block. The poly(alkenylbenzene) blocks are crosslinked to form the desired nano-particles. The poly(diene) blocks are preferably hydrogenated to form a polycrystalline surface layer on the nano-particles. The nano-particles have diameters—expressed as a mean average diameter—that are preferably less than 100 nm, more preferably less than about 50 nm, and most preferably less than about 25 nm. The nano-particles preferably are substantially monodisperse and uniform in shape. The dispersity is represented by the ratio of $M_w$ to $M_n$, with a ratio of 1 being substantially monodisperse. The polymer nano-particles of the present invention preferably have a dispersity less than about 1.3, more preferably less than about 1.2 and most preferably less than about 1.1. In addition, the nano-particles are preferably spherical, although a limited number of shape defects are acceptable. Furthermore, the nano-particles generally retain their discrete nature with little or no linkage between particles.

The nano-particles are preferably formed via dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination.

With respect to the monomers and solvents identified herein, nano-particles are formed by maintaining a temperature that is favorable to polymerization of the selected monomers in the selected solvent(s). Preferred temperatures are in the range of about −40 to 250° C., with a temperature in the range of about 0 to 150° C. being particularly preferred. As described in more detail below, the interaction of monomer selection, temperature and solvent, facilitates the formation of diblock polymers which form micelles and ultimately the desired nano-particles.

According to a preferred embodiment of the invention, a first diblock polymer is formed of vinyl aromatic hydrocarbon monomers and diene monomers in the hydrocarbon solvent. The diblock polymer contains a first end block that is soluble in the dispersion solvent, preferably the diene monomer, and a second end block which is less soluble in the dispersion solvent, preferably the vinyl-substituted aromatic hydrocarbon monomer. Moreover, in one preferred embodiment, a vinyl-substituted aromatic hydrocarbon monomer is chosen which is insoluble in the dispersion solvent.

As is known in the art, such a diblock copolymer may be formed by living anionic polymerization, in which the vinyl-substituted aromatic hydrocarbon monomer is added to the completely polymerized diene monomer. Another method of forming substantially diblock polymers is the living anionic copolymerization of a mixture of a diene monomer and a vinyl-substituted aromatic hydrocarbon monomer in a hydrocarbon solvent, particularly, in the absence of certain polar additives, such as ethers, tertiary amines, or metal alkoxides which could otherwise effect the polymerization of the separately constituted polymer blocks. Under these conditions, the diene generally polymerizes first, followed by the polymerization of the vinyl-substituted aromatic hydrocarbon.

In either process, it is preferred that the diene block polymerize first, followed by the vinyl substituted aromatic, positioning the living end of the polymerizing polymer on the vinyl aromatic block to facilitate later cross-linking.

Such diblock copolymers, formed by either method, are believed to aggregate to form micelle-like structures, with for example, the vinyl-substituted aromatic blocks directed toward the centers of the micelles and the diene blocks as tails extending therefrom. It is noted that a further hydrocarbon solvent charge or a decrease in polymerization mixture temperature may also be used, and may in fact be required, to obtain formation of the micelles. Moreover, these steps may be used to take advantage of the general insolubility of the vinyl-aromatic blocks in hydrocarbons. An exemplary temperature range for micelle formation is between about 25 and 100° C.

After the micelles have formed, additional diene monomer and/or vinyl-substituted aromatic hydrocarbon monomer can be added to the polymerization mixture as desired.

After formation of the micelles, a cross-linking agent is added to the polymerization mixture. Preferably a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the nano-particle. Consequently, nano-particles are formed from the micelles with a core including, for example, styrene monomer units and a surface layer including, for example, butadiene monomer units.

The present inventive process is preferably initiated via addition of anionic initiators that are known in the art as useful in the copolymerization of diene monomers and vinyl aromatic hydrocarbons. Exemplary organo-lithium catalysts include lithium compounds having the formula $R(Li)_x$, wherein R represents a $C_1$–$C_{20}$ hydrocarbyl radical, preferably a $C_2$–$C_8$ hydrocarbyl radical and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, etc.

Specific examples of exemplary initiators include ethyllithium, propyllithium, n-butyllithium, sec-butyllithium, tert-butyllithium, and the like; aryllithiums, such as phenyllithium, tolyllithium, and the like; alkenyllithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred.

Specific examples of other suitable lithium initiators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Anionic initiators generally are useful in amounts ranging from about 0.01 to 60 millimoles per hundred grams of monomer charge.

The diene monomers contemplated for the diblock polymer are those soluble in non-aromatic hydrocarbon solvents. $C_4$–$C_7$ diene monomers, such as butadiene isoprene, pentadiene, hexadiene, heptodiene, and mixtures thereof are the most preferred. Exemplary diene monomers are conjugated dienes, and include 1,3-butadiene, isoprene, 1,3-pentadiene, and mixtures thereof.

Vinyl-substituted aromatic hydrocarbon monomers include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than about 18, as well as any di- or tri-vinyl substituted aromatic hydrocarbons.

The diblock polymer, preferably has $M_w$ of about 5,000 to 200,000, more preferably between about 10,000 and 100,000. A typical diblock polymer will be comprised of 5 to 99% by weight diene and 1 to 95% by weight vinyl-substituted aromatic hydrocarbon, more preferably 10 to 98% by weight diene, and most preferably 20 to 95% by weight diene. The preferred vinyl substituted aromatic hydrocarbon content is between about 2 and 90% by weight, most preferably between about 5 and 80% by weight.

The micelle formed by the polymerization of vinyl-substituted aromatic hydrocarbons and diene monomers is preferably crosslinked to enhance the uniformity and permanence of shape and size of the resultant nano-particle. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers are acceptable. A preferred crosslinking agent is divinylbenzene (DVB).

Without being bound by theory, it is believed that an exemplary micelle will be comprised of ten to one hundred diblock polymers yielding, after crosslinking, a nanoparticle having a $M_w$ of between about 100,000 and 10,000,000, preferably between about 500,000 and 4,500,000.

After micelle formation, or alternatively, after crosslinking, the polydiene blocks are hydrogenated to form the desired polycrystalline surface layer. The hydrogenation step may be carried out by methods known in the art for hydrogenating polydienes. A preferred hydrogenation method includes placing the crosslinked nano-particles in a hydrogenation reactor in the presence of a catalyst. After the catalyst has been added to the reactor the pressure is adjusted to a desired range, preferably between about 10 and 3000 kPa, more preferably between about 50 and 2600 kPa. Hydrogen gas ($H_2$) is then charged to the reactor to begin the hydrogenation reaction. $H_2$ may be charged continuously or in individual charges until the desired conversion is achieved. Preferably, the hydrogenation reaction will reach at least about 40% conversion, more preferably greater than about 85% conversion. The conversion reaction may be monitored by $H^1$ NMR.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octolate, nickel ethylhexanoate, and mixtures thereof.

After the polymer nano-particles have been formed, they may be blended with a rubber to improve the physical characteristics of the rubber composition. Nano-particles are useful modifying agents for rubbers because they are discrete particles which are capable of dispersing uniformly throughout the rubber composition, resulting in uniformity of physical characteristics. Furthermore, the present polymer nano-particles are advantageous because the polycrystalline surface layer provides a surface less likely to agglomerate with other nano-particles and more likely to disperse evenly throughout the preferred rubber composition.

The present polymer nano-particles are suitable for modifying a variety of rubbers including, but not limited to, random styrene/butadiene copolymers, butadiene rubber, poly(isoprene), nitrile rubber, polyurethane, butyl rubber, EPDM, and the like. Advantageously, the nano-particles demonstrate improved tensile and tear strength of at least about 30% over non-spherical copolymers.

One application for such rubber compounds is in tire rubber formulations. Specifically, they are contemplated for use in rubber compounds used to make tire treads and side walls.

Of course, the present inventive nano-particles are also suited to other presently existing applications for nano-particles, including the medical field, e.g. drug delivery and blood applications, information technology, e.g. quantum computers and dots, aeronautical and space research, energy, e.g., oil refining, and lubricants.

The present invention now will be described with reference to non-limiting example. The following example is presented for purposes of illustration only and are not to be construed in a limiting sense.

EXAMPLE

An 8 L polymerization reactor was used for the nanoparticle preparation. The reactor was first charged with 0.51 kg of hexane, then was charged with 1.04 kg of butadiene/hexane blend that contained 21.6 wt % of butadiene (Bridgestone/Firestone Polymer Co., Akron, Ohio). The batch was then heated to 57° C. After the temperature stabilized, polymerization was initiated with 5.4 mL of a 1.5 M solution of butyllithium in hexane (Bridgestone/Firestone Polymer Co., Akron, Ohio). The batch temperature was maintained at 57° C. for the duration of polymerization. After 2 hours (when the reaction was finished), the reactor was charged with 0.68 kg of styrene/hexane blend that contained 33 wt % of styrene (Bridgestone/Firestone Polymer Co., Akron, Ohio). After an additional two-hour reaction period, the reactor was charged with 1.8 kg of hexane and the 50 mL of divinyl benzene. The reactor was maintained at 57° C. for another two hour period, and a small amount of the product was taken for GPC analysis. The GPC analysis of the product showed that the polymer had a number average molecular weight of 826,559. The polydispersity was 1.10. The conversion of the reaction was about 100%.

2.04 kg of the product was then transferred to a 4 L hydrogenation reactor. Then, the reactor was charged with 75 mL of a Ni catalyst solution, which was made according to the following procedure:

111 mL of nickel octolate (8 wt % in hexane), 37 mL hexane, and 6 mL of cyclohexene were charged to a 1 liter $N_2$ purged bottle. Then, the bottle was placed into a dry ice bath. A charge of 266.4 mL of tributyl aluminum (0.68 M in hexane) was slowly added into the bottle while kept cool.

The hydrogenation reactor, containing polymer product and catalyst was then heated to 120° C. After the temperature stabilized, the hydrogenation was initialized by charging high pressure $H_2$ gas into the reactor to about 792 kPa. After about 15 minutes, the pressure dropped as the $H_2$ began to react. The reactor was again recharged to about 792 kPa. The procedure was then repeated until the butadiene hydrogenation conversion reached about 95%, based on $H^1$ NMR analysis. The reactor was then cooled and the product dropped into isopropanol solvent. The obtained polymer particles were dried in vacuum for 2 days at 23° C.

A small amount of the obtained polymer particles were placed in a DSC aluminum pan. Thermal analysis was performed on a TA instrument modulated DSC 2920 using a $N_2$-purged cell at a flow rate of 80 mL/min. The heat flow signal was recorded at 5° C./min. heating rate. The analysis showed that the material had a melting peak around 100° C., i.e. typical of polyethylene. FIG. 1 displays the result.

Figure 2:
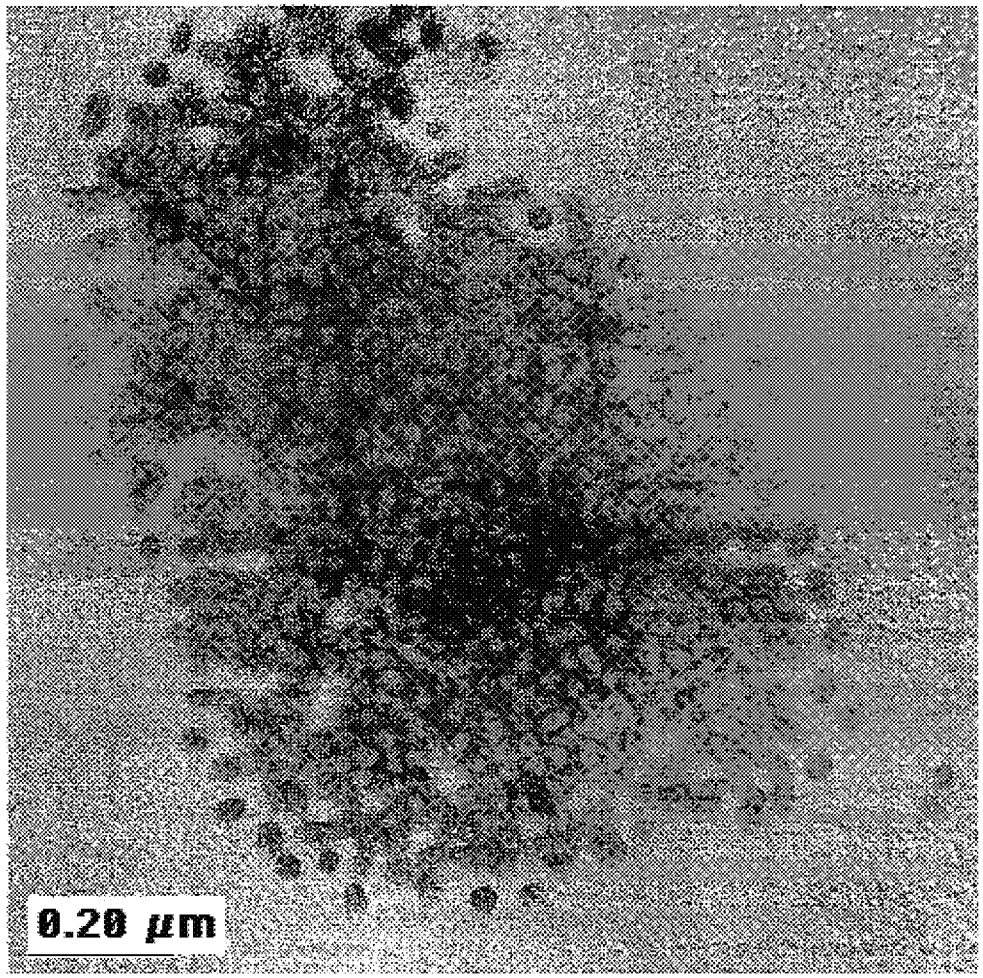
FIG. 2 is a transmission electron microscopy photograph of the inventive polycrystalline nano-particles.

For transmission electron microscopy (TEM) analysis, a small amount (~3 mg) of the obtained polymer particles were dispersed into about 40 mL hexane solvent using ultrasonic vibration. A drop of the solution was then coated on a graphed copper micro-screen. After the solvent was evaporized, the screen was examined by TEM. The results showed that the average particle size was ~30 nm, and the dispersity of the particle size was about 1.1. FIG. 2 shows the TEM image of the crystalline polymer nano-particles.

The invention has been described with reference to the exemplary embodiments. Modifications and alterations may appear to others upon reading and understanding the specification. However, the invention is intended to include such modifications and alterations insofar as they come within the scope of the appended claims.

We claim:

1. A polymer nano-particle composition comprising polymer nano-particles having:
   a. a poly(alkenylbenzene) core, and
   b. a surface layer comprising a crystalline polyolefin,
wherein said nano-particles have a mean average diameter of less than about 100 nm.

2. The composition of claim 1 further comprising an initiator residue derived from an anionic polymerization initiator.

3. The composition of claim 1 wherein said poly (alkenylbenzene) comprises monomer contributed units from one or more of styrene, α-methylstyrene, 1-vinyl naphthalene, 2-vinyl naphthalene, 1-α-methyl vinyl naphthalene, 2-α-methyl naphthalene, vinyl toluene, methoxystyrene, t-butoxystyrene, as well as alkyl, cycloalkyl, aryl, alkaryl, and aralkyl derivatives thereof, in which the total number of carbon atoms in the combined hydrocarbon is generally not greater than about 18, as well as any di- or tri-vinyl substituted aromatic hydrocarbons.

4. The composition of claim 1 further comprising a crosslinking agent.

5. The composition of claim 4 wherein said crosslinking agent comprises a multi-functional organic compound.

6. The composition of claim 1 wherein said crystalline polyolefin is derived from a hydrogenated polydiene.

7. The composition of claim 6 wherein said polydiene comprises monomer units selected from one or more of butadiene, pentadiene, hexadiene, isoprene, and heptadiene.

8. The composition of claim 6 wherein said polydiene is derived from conjugated diene monomer units.

9. The composition of claim 1 wherein said nano-particles have a polydispersity less than about 1.3.

10. A process for forming polymer nano-particles comprising:
   a. polymerizing alkenylbenzene monomer and diene monomer in a hydrocarbon solvent to form a diblock polymer;
   b. forming a polymerization mixture including micelles of said diblock polymer;
   c. adding at least one crosslinking agent to the polymerization mixture to form crosslinked nano-particles having a poly(alkenylbenzene) core and a poly(conjugated diene) surface layer from said micelles; and
   d. hydrogenating the poly(conjugated diene) surface layer to provide a polycrystalline surface layer.

11. The process of claim 10 wherein step a is performed in the presence of a lithium initiator.

12. The process of claim 10 wherein subsequent to step a, further hydrocarbon solvent is added to the polymerization mixture.

13. The process of claim 10 wherein said alkenylbenzene monomer is one or more of styrene, α-methylstyrene, 1-vinyl naphthalene, 2-vinyl naphthalene, 1-α-methyl vinyl naphthalene, 2-α-methyl naphthalene, vinyl toluene, methoxystyrene, t-butoxystyrene, as well as alkyl, cycloalkyl, aryl, alkaryl, and aralkyl derivatives thereof, in which the total number of carbon atoms in the combined hydrocarbon is generally not greater than about 18, as well as any di- or tri-vinyl substituted aromatic hydrocarbons.

14. The process of claim 10 wherein said crosslinking agent comprises a multi-functional organic compound.

15. The process of claim 10 wherein said diene monomer is selected from one or more of butadiene, isoprene, pentadiene, hexadiene, and heptadiene.

16. The process of claim 10 wherein said diene monomer is a conjugated diene monomer.

17. The process of claim 10 wherein said nano-particles have a mean average diameter of less than about 100 nm.

18. The process of claim 10 wherein said hydrocarbon solvent is selected from one or more of pentane, hexane, heptane, octane, nonane, decane, cyclohexane, methyl cyclopentane, cyclooctane, cyclopentane, cycloheptane, cyclononane, and cyclodecane.

19. A polymer nano-particle comprising a polycrystalline outer surface, a vinyl-substituted aromatic hydrocarbon contributed unit core including a crosslinking agent, and wherein said nano-particles are less than about 100 nm in diameter and have a $M_w$ between about 100,000 and 10,000,000.

20. A rubber composition comprising a blend of rubber and a plurality of said polymer nano-particles of claim 19.

* * * * *